ATTEST
Lloyd A. Henevold

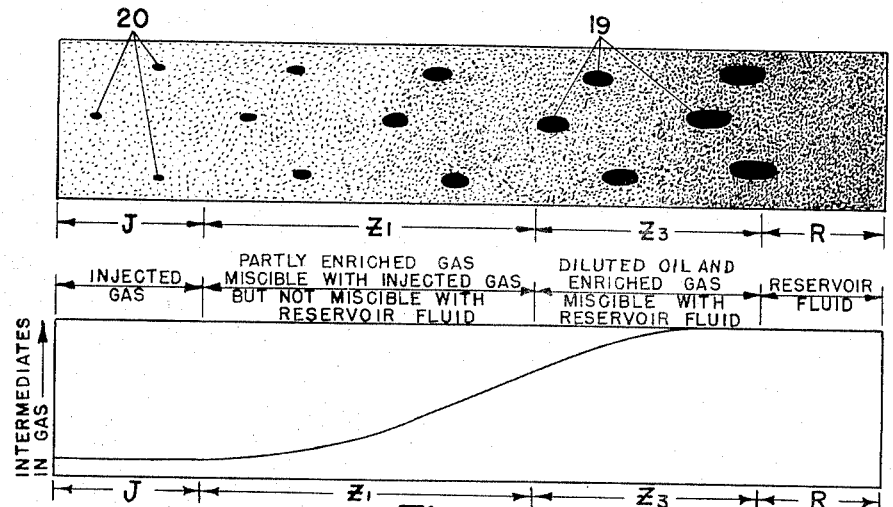
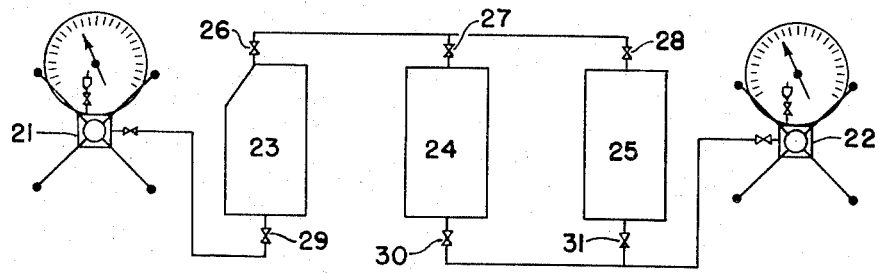
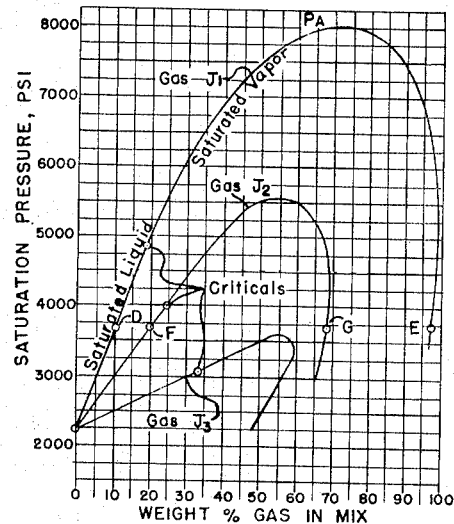
Fig. 2
Fig. 3
Fig. 4
INVENTOR.
Eugene R. Brownscombe
Leonidas P. Whorton
Attorney Nov. 22, 1955  L. P. WHORTON ET AL  2,724,438
METHOD OF RECOVERING DESIRABLE PETROLEUM HYDROCARBON
FRACTIONS FROM PRODUCING OIL RESERVOIRS
Filed March 1, 1954  5 Sheets-Sheet 4

INVENTOR.
Eugene R. Brownscombe
BY Leonidas P. Whorton

Harbert E. Birch
Attorney

Nov. 22, 1955 L. P. WHORTON ET AL 2,724,438
METHOD OF RECOVERING DESIRABLE PETROLEUM HYDROCARBON
FRACTIONS FROM PRODUCING OIL RESERVOIRS
Filed March 1, 1954 5 Sheets-Sheet 5

ATTEST
Lloyd O. Heneveld

INVENTOR.
Eugene R. Brownscombe
BY Leonidas P. Whorton

Norbert E. Linh
Attorney

United States Patent Office 2,724,438
Patented Nov. 22, 1955

2,724,438

METHOD OF RECOVERING DESIRABLE PETROLEUM HYDROCARBON FRACTIONS FROM PRODUCING OIL RESERVOIRS

Leonidas P. Whorton and Eugene R. Brownscombe, Dallas, Tex., assignors to The Atlantic Refining Company, Philadelphia, Pa., a corporation of Pennsylvania Application March 1, 1954, Serial No. 413,112

4 Claims. (Cl. 166—7)

This invention relates to increasing the ultimate recovery of oil from oil reservoirs, and more particularly to a method of obtaining increased production from such reservoirs by injecting normally gaseous hydrocarbons under high pressures within a certain pressure range dependent upon the compositions of the reservoir oil and the injection gas and thereby obtaining the maximum recovery of the oil from the reservoir.

This application is a continuation-in-part of application Serial No. 86,414, filed April 9, 1949; application Serial No. 99,650, filed June 17, 1949; and application Serial No. 142,568, filed February 6, 1950; now abandoned; and application Serial No. 240,748, filed August 7, 1951, all of which applications are joint applications in the names of the applicants in the present application.

In the recovery of oil from a subsurface oil reservoir, it has been the practice heretofore to permit the oil to flow from the reservoir under the force of the native reservoir energy which may be in the form of water, gas cap, or solution gas drive, or combinations thereof. This production by a native reservoir energy is commonly referred to as "primary recovery." Further, it has been common practice to augment the native reservoir energy either during the early stages of oil production or, more often, after the reservoir has approached its economic production limit by primary recovery methods. This may be accomplished by any one or more of several known methods, including gas and water injection to provide artificial pressure drives, and production in this manner is termed "secondary recovery." In providing a reservoir with such a gas or water drive it is conventional practice to inject the gas or water into the oil producing zone at a relatively low pressure of the order of 1,500 p. s. i. Although these methods of secondary recovery have resulted in an increase in the ultimate recovery of oil over that possible solely by means of primary recovery methods, in some cases only about 20% to 30% of the initial oil in place is recovered and frequently as much as 50% of the oil remains after depletion of the reservoir.

As pointed out in our copending application, Serial No. 240,748, the method of that invention is applicable only to producing reservoirs as distinguished from depleted reservoirs. This limitation also applies to the method of this invention, therefore as used herein a "producing reservoir" is one in which the unswept-out portion of the reservoir is or may be substantially filled with the liquid phase to the exclusion of any appreciable separate gaseous phase. More specifically, it is a reservoir which when subjected to a pressure of 6,000 p. s. i. will have a free gas content below the critical gas saturation, the critical gas saturation being the minimum free gas content of a reservoir at a given pressure which will enable the independent flow of gas through the entire reservoir as a separate gaseous phase. (For a definition of critical gas saturation as used herein see Geffen, Owens, Parrish and Morse, Transactions, AIME, 192 (1951) p. 106.) Although a reservoir may be most economically treated by this method if treatment is begun early enough in the life of the reservoir that no separate gas phase has appeared therein, the method is applicable to reservoirs which, though having a separate gaseous phase therein prior to the start of treatment, have a relatively low free gas content such that when the pressure on the reservoir is increased by the injection of gases incident to the practice of the method, any free gas will go back into solution with the liquid phase whereby the unswept-out portion of the reservoir, that is the portion ahead of the advancing front from the injected gases, will be substantially completely liquid filled. Thus a "producing" reservoir, as used in this invention, includes reservoirs which at the beginning of treatment by the method of this invention either contain (1) undersaturated liquid reservoir oil, or (2) saturated liquid oil and a small volume of free gas such that the free gas in the unswept-out portion of the reservoir at the higher reservoir pressure resulting from the injected gas will be pushed into solution with the liquid reservoir oil, thus making the reservoir oil in the unswept-out portion undersaturated.

It will be appreciated by those skilled in the art that a producing reservoir may exist in which a critical gas saturation has developed due to the lowering of the reservoir pressure below the original saturation pressure of the reservoir. The original saturation pressure of a reservoir is the lowest pressure at which all of the normally gaseous hydrocarbons originally existing in the reservoir will remain dissolved in the reservoir oil. Lowering of the reservoir pressure below the original saturation pressure might occur when a reservoir is allowed to flow for an extended period of time by solution gas drive. In these cases the reservoir oil may have its free gas content reduced to below the critical gas saturation by increasing the pressure on the reservoir back up to a pressure equal to or above the original saturation pressure of the reservoir fluid, since the free gas which separated from the liquid upon lowering of the pressure will be reabsorbed by the liquid when the pressure thereon is raised to the value which existed just before the free gas began separating. Thus, it will be appreciated that the unswept-out portion of a producing reservoir which before treatment, according to this invention, has a critical gas saturation may be caused to become substantially filled with the liquid phase of reservoir fluid to the exclusion of a separate gaseous phase by raising the pressure on the reservoir to or above a pressure equal to the original gas saturation pressure of the reservoir fluid.

One object of the present invention is to provide an improved method of producing oil from an oil reservoir which will result in a higher ultimate recovery of stock tank oil with the use of pressures within a certain range dependent upon the compositions of the reservoir oil and the injection gas used.

Another object of this invention is to provide a method of increasing the ultimate recovery of oil from oil reservoirs by injecting therein normally gaseous hydrocarbons at a pressure below that which is necessary for complete miscibility between the reservoir oil and the injected gas but at a pressure sufficiently high to maintain miscibility between the reservoir oil and the front portion of the injected gas.

Other objects and advantages of this invention will become apparent from the description and drawings which follow.

Figure 2 is a schematic representation of the displacement mechanism of the process of this invention.

Figure 3 is a diagrammatic view of an apparatus for carrying out an experiment for determining the upper limit of the pressure range contemplated for the practice of this invention.

Figure 4 is a curve illustrating the data which is obtained by the apparatus of Figure 3.

Figure 6:
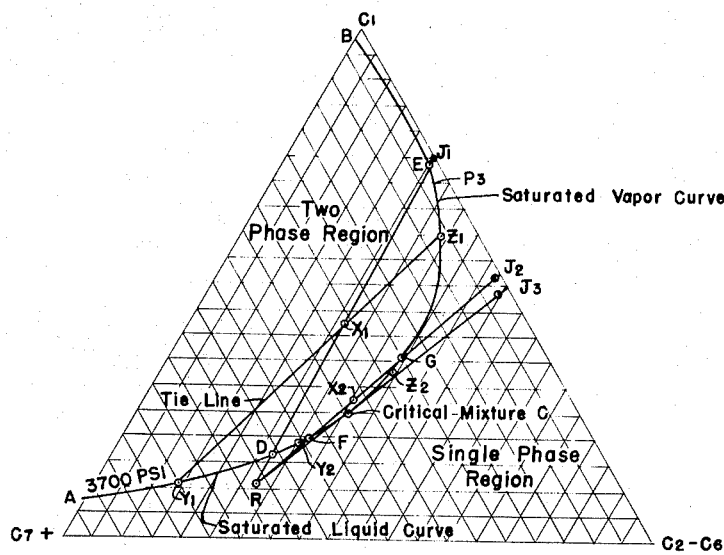
Figure 7:
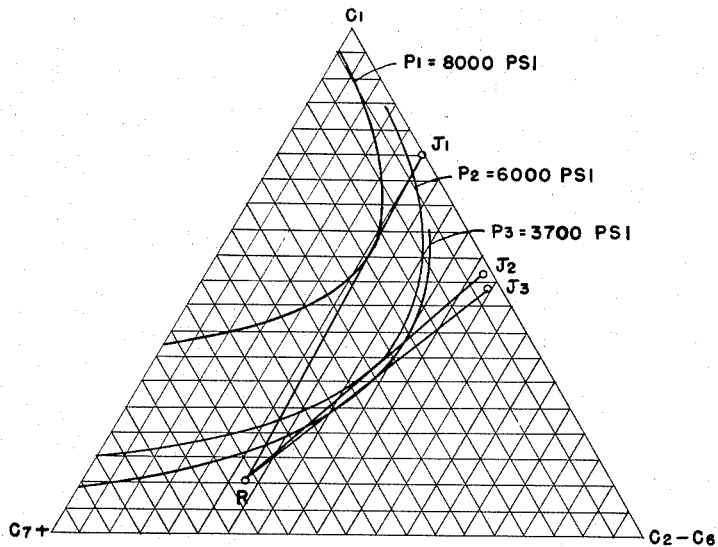
Figure 8:
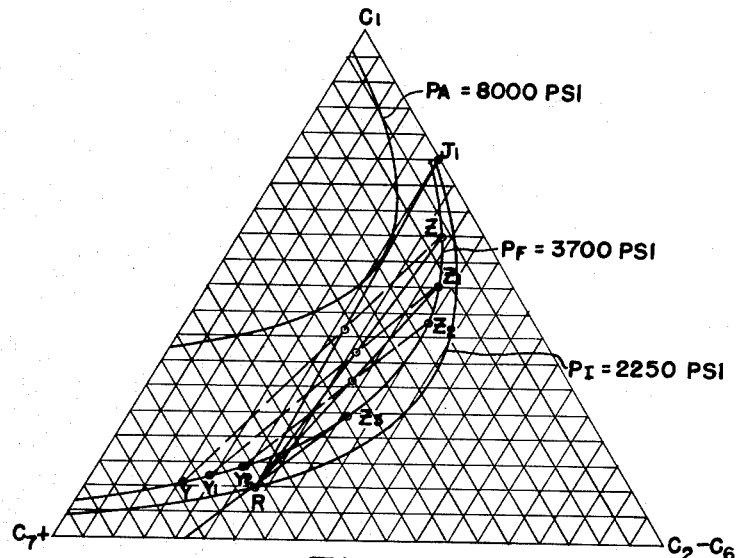

Figures 6, 7, and 8 show triangular phase diagrams which graphically illustrate the pressure range contemplated for use in the process of this invention.

Figure 9:
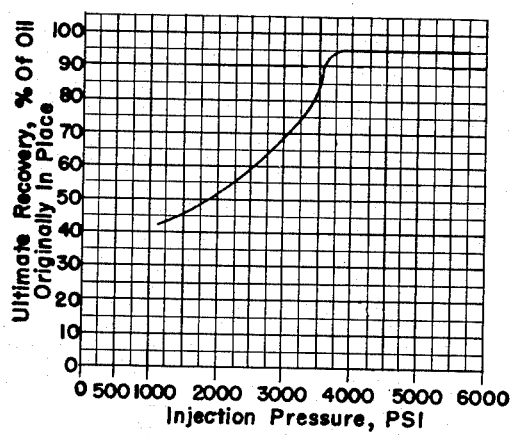

Figure 9 is a curve illustrating the relationship of the per cent recovery of original stock tank oil in place to the pressure maintained on a typical reservoir by the injection of normally gaseous hydrocarbons.

Figure 10:
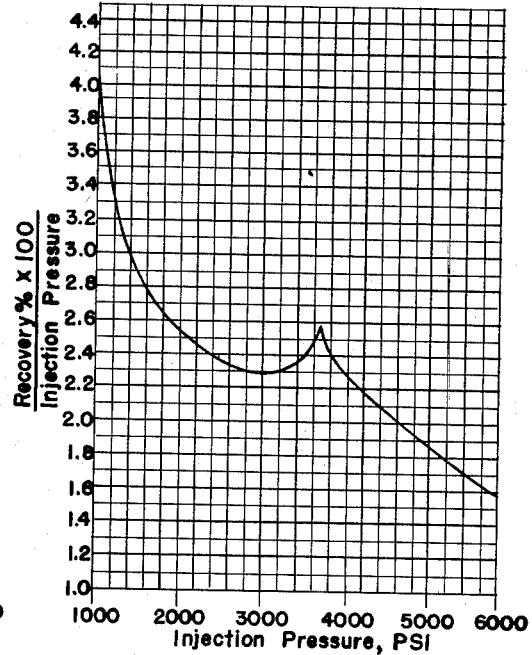

Figure 10 is a curve illustrating the unexpected recovery increase per unit pressure obtained by the use of the pressure range contemplated by this invention.

Figure 1:
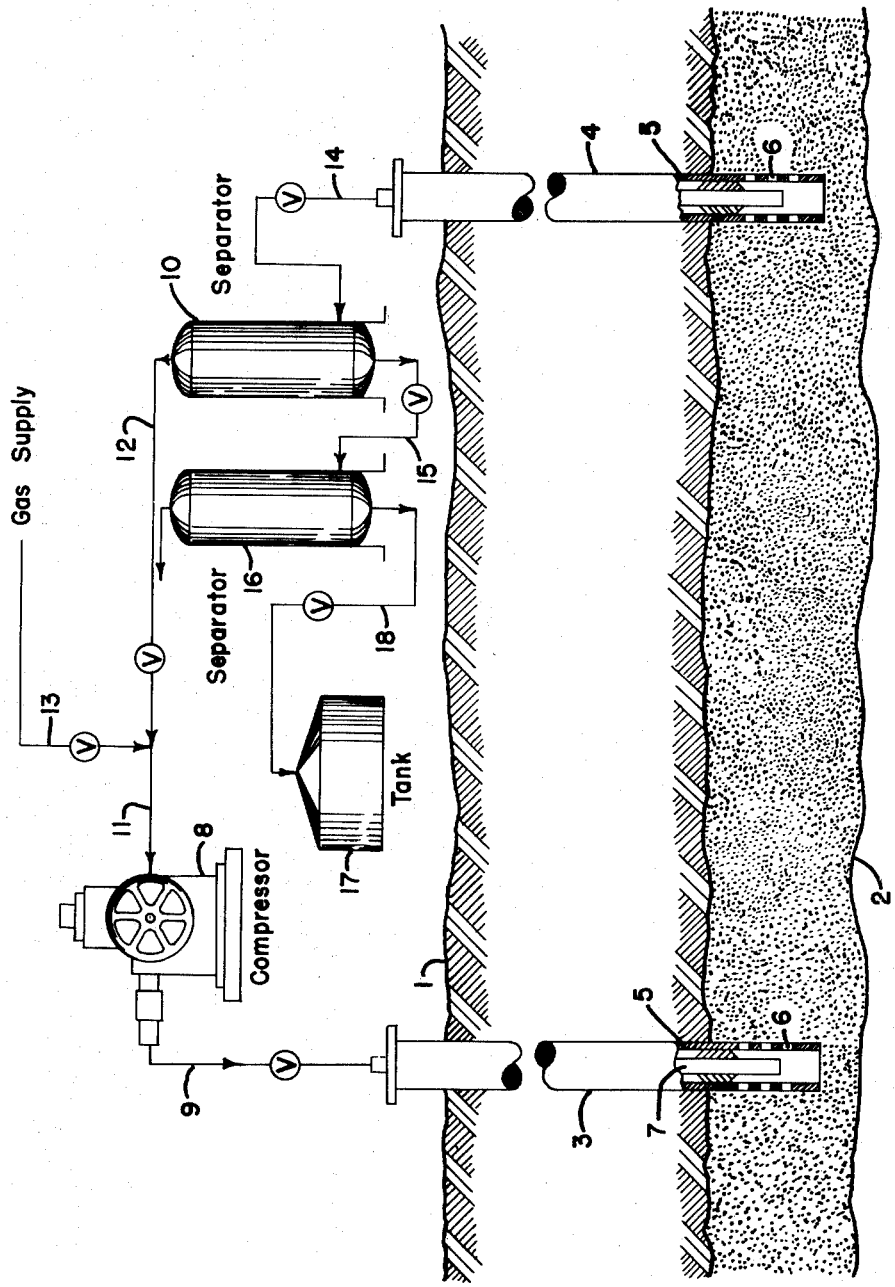
Figure 1 is a diagrammatic view of the system for carrying out the present invention.

In the drawings, Figure 1 is a diagrammatic view showing a system which may be used for carrying out this invention. It will be understood, of course, that the same system may be used regardless of whether the reservoir is to be operated so as to practice the process of this invention or to practice conventional gas injection processes. In Figure 1, numeral 1 denotes generally the surface of the earth. Communicating with oil reservoir 2 are injection well 3 and production well 4. These wells may be of a conventional type and each includes, for example, at least a casing string 5, the interior of which is in communication with reservoir 2 through suitable perforations 6, and a tubing string 7 disposed within the casing for conducting fluids to or from the reservoir.

Normally gaseous hydrocarbons, such as gaseous mixtures containing methane with minor amounts of the lower molecular hydrocarbons, are compressed to a desired pressure and necessarily above the existing reservoir pressure by a suitable compressor 8, which may be of any conventional type, and are passed through valve controlled pipe 9 into injection well 3 from which the injection gas flows into the reservoir to contact the oil contained therein. Gas from a conventional oil field separator 10, provided for stabilization of production well 4, may be employed as the injection gas, the separator gas entering compressor 8 through flow pipe 11 and valve controlled line 12. In practice, however, the volume of the separator gas is inadequate, making it necessary to supplement it with gas obtained from a suitable external source, not shown, such as a gas well. If desired, the injection gas may consist solely of gas from the external source, which gas is conducted to compressor 8 through valve controlled line 13 and flow pipe 11.

Simultaneously with the injection of gas into the reservoir, oil which is swept from the reservoir by the injected gas is removed to the surface of the earth through production well 4. This oil produced through well 4 flows by means of valve controlled pipe 14 into separator 10, operated at a pressure of, for example, 500 p. s. i. less than the pressure of the oil at the well head, wherein the oil is stabilized. As pointed out hereinabove, the separator gas, which comprises normally gaseous hydrocarbons, is conducted by means of lines 12 and 11 into compressor 8 and is compressed to the desired pressure for injection into the reservoir. The oil fraction from separator 10 flows through valve controlled pipe 15 into a second separator 16, which preferably is operated at atmospheric pressure. Although the separator gas from separator 16 may be reinjected into the reservoir through well 3, because of the relatively high cost involved in the repressuring thereof, it is preferable to employ such gas for other purposes, for example, as fuel for the operation of auxiliary field equipment. The oil is passed from separator 16 into a suitable storage tank 17 by means of valve controlled flow line 18.

In our copending application, Serial No. 240,748, filed August 7, 1951, we disclosed the above method particularly pertaining to supplying additional energy to an oil reservoir in the form of high pressure hydrocarbon gases. That method is not a "secondary recovery" method in the sense in which that term has come to be used in the art, but is concerned with treating a producing oil reservoir early in its production life, preferably from the very beginning of production, so that more oil will be recovered than would be possible by any known method or combination of methods of conventional primary and secondary recovery. In this respect, that invention deals with an improved method of obtaining oil by injecting high pressure normally gaseous hydrocarbons into a reservoir while it is still a "producing" reservoir rather than first allowing it to become "depleted" by conventional recovery methods. More specifically, the method of application Serial No. 240,748 deals with injecting at high pressures normally gaseous hydrocarbons into a reservoir which either contains undersaturated reservoir oil or liquid oil and a small volume of free gas. In this latter type of reservoir its free gas content is small so that at the injection pressures the free gas will be absorbed by the reservoir oil thereby making the reservoir oil undersaturated. This invention is an improvement over our copending application, Serial No. 240,748, in that it relates to the use in the process of a specific range of pressures which gives an unexpected and advantageous result.

We have discovered that the high pressure gas process described above which was disclosed in Serial No. 240,748 can be varied to provide three basic processes each of which will give percentage increases in the recovery of the oil in place in a reservoir. One of these processes which heretofore has not been specifically practiced or known will give an unexpected recovery which has not been realized by those skilled in the art. This novel process which is the subject matter of this application involves injecting normally gaseous hydrocarbons into a reservoir at pressures within a range which will be set forth hereinafter.

In one of the three basic processes referred to above, which shall hereinafter be referred to as the "High Pressure I" type process, the enriched displacing gas is immiscible with the reservoir oil at the pressure at which the displacing gas is being injected. In other words, at all stages of the process gas is displacing oil with an interface between the phases. The "High Pressure I" type process is similar to conventional low pressure gas processes except that the pressures are much greater thereby setting up between the reservoir oil and injected gas a so-called zone of contact containing progressively more hydrocarbon intermediates from its trailing back portion to its leading front portion. These fluids in the zone of contact provide for a more favorable displacement of the reservoir oil because of the better viscosity ratios between such fluids and the reservoir oil and the injected gas. In this so-called "High Pressure I" type process, the injection pressures are greater than the lower limit of the pressure range of this invention. For the exemplified system of a gas $J_1$ and reservoir oil R as herein described wherein the original saturation pressure of R is 2780 p. s. i., the "High Pressure I" type process would be practiced if the gas $J_1$ was injected at the pressure within the pressure range from 2780 p. s. i. to approximately 3700 p. s. i. which would be the lower limit of this invention.

The second process, which shall hereinafter be referred to as the "complete M" type process, takes place when the injected gas is injected at such a high pressure that the original injected gas is miscible in all proportions with the reservoir fluid at the injection pressure. When a gas is miscible in all proportions with a liquid, any mixture of the gas and liquid will result in one phase regardless of the percentages of such gas and liquid. In this case, because the gas and reservoir fluids are miscible with each other, there never exists an interface between the hydrocarbon gases and the hydrocarbon liquids and therefore recovery of the oil in place in the reservoir approaches near 100% because the controlling physical factors limiting oil recovery today, which are immiscibility between the displacing and displaced fluid phases in a reservoir and the associated interfacial forces have been eliminated. The pressure necessary for practicing the "complete M" type process has to exceed the cricondenbar which is referred to and explained in more detail hereinafter. For the exemplified system previously referred to in respect to the "High Pressure I" type process, the cricondenbar is 8000 p. s. i. Therefore in practicing the 'complete M" type process pressures above 8000 p. s. i. would have to be employed.

A third process which we have found to give unexpected recoveries shall be referred to as an "M front" process. This "M front" process forms the subject matter of this invention. We have found that when gas is injected into a reservoir containing undersaturated reservoir oil at a high pressure which falls within a certain pressure range below the pressure where the original injection gas is completely miscible with the reservoir fluid ("complete M" type process), something more than a mere pushing out of the oil occurs such as is the case in the "High Pressure I" type process. Specifically, in the "M front" process a so-called zone of contact containing hydrocarbons which at the leading front portion are miscible with the reservoir oil and at the trailing back portion are miscible with a gas is formed between the injected gas and the reservoir oil. This zone of contact is formed due to the stripping of intermediates by the injected gas and also due to the dissolving of the injected gas into the reservoir oil. In this "M front" process sufficient amount of gas is dissolved by the reservoir oil and sufficient amount of intermediates are stripped by the gas to make the fluid contained in such zone miscible at its leading front portion with the reservoir oil and miscible at the trailing back portion with the injected gas. Accordingly, the fluids in the zone of contact make possible a complete miscible displacement of the reservoir oil to the same extent as that which occurs in the use of the "complete M" type process. For the same exemplified system previously referred to the range of pressures for practicing the "M front" process would be 3700 p. s. i. to 8000 p. s. i. For obvious reasons 3700 p. s. i. is the preferred pressure to be employed.

The above phenomenon can be explained by referring to Figure 2 wherein is shown a schematic representation of the oil displacement in the "M front" process. Figure 2 illustrates that an exchange of hydrocarbon components between the gas and the oil takes place, resulting in a modification of the properties of both phases and thereby setting up the zone of contact previously referred to. The intermediate hydrocarbons, largely $C_2$ through $C_6$, are the main materials involved in this exchange. The change in concentration of these intermediates resulting from the transfer works to make the gas and oil which are in contact more alike.

In Figure 2, the section of the reservoir containing undersaturated reservoir oil is represented by the heavy stippled area R. The section containing injected gas which is used to displace the oil is shown by the lightly stippled area J. This injected gas is a lean gas comprising principally methane. Sections $Z_1$ and $Z_3$ comprise the zone of contact previously referred to. $Z_3$ comprises principally a mixture of diluted reservoir oil and enriched injected gas. The fluids in $Z_3$ adjacent section R are completely miscible with the reservoir fluid. The fluids in section $Z_1$ are comprised principally of enriched gas. The enriched gas adjacent section J is miscible with the injected gas. It should be realized that from the leading portion of the zone of contact which is adjacent section R to the trailing portion, there is a gradual change in the molecular weight of the hydrocarbons in the zone of contact. This change is from liquid to gas. This gradual change is indicated by the variation in the density of the stippling. It should also be understood that regardless of this change that the hydrocarbons at any one point in the zone of contact are miscible with the surrounding hydrocarbons.

Figure 2 shows the zone of contact as it is being set up at the start of the process of this invention. As the injected gas moves through the reservoir at the start of the process, it extracts the intermediate weight hydrocarbons from the residual oil and at the very front a reservoir oil absorbs some of the injected gas. This enrichment of the gas and dilution of reservoir oil is represented by areas $Z_1$ and $Z_3$. While the zone of contact is being set up, reservoir fluid is by-passed at the front. This residual by-passed oil is represented by dark areas 19 which are the same density as the reservoir fluid since they have the same composition. As the enriched gas and diluted oil flow through the reservoir at the start of the process, the by-passed oil 19 flows along with such fluids surrounding it but at a slower rate because of their higher viscosity. In this step the by-passed residual oil units 19 are somewhat reduced in volume as a result of their mixing with the diluted oil and enriched gas. This mixing of additional oil with the enriched gas-diluted oil mixture helps maintain the condition of miscibility required for the process. In section $Z_1$ the by-passed oil no longer flows along with the gas but the intermediate weight hydrocarbons are gradually extracted from it and dissolved into the gas thereby causing such intermediate weight hydrocarbons to go into the gaseous phase. In section J there is shown as black areas 20 the small amount of residual oil which is left behind the zone of contact. It should be understood that Figure 2 shows the zone of contact as it is being set up. Within the pressure range taught by this invention, a distinct interface never exists in the zone of contact. In other words, although both gases and liquid phases are present at various locations in the zone, the transition from liquid to gas is so gradual that two phases would never be visible at one time.

The curve at the lower part of Figure 2 shows the relative concentration of intermediates in the zone of contact and in the reservoir oil and injected gas. It should be apparent from the curve that progressing from the injected gas to the reservoir fluid the concentration of intermediates becomes increasingly greater. This concentration of intermediates is such that hydrocarbons at any one point in the zone of contact are miscible with the surrounding hydrocarbons and at the leading portion of the zone of contact the fluids are miscible with a reservoir oil while at its trailing portion the fluids are miscible with the injected gas.

From this description it is seen that a transition zone or a "zone of contact" is located between the reservoir oil of section R and the lean gas of section J. This zone of contact contains both diluted reservoir oil and enriched gas so that at its front portion it is miscible with the reservoir oil and at its back portion it is miscible with injected gas. This miscibility with both the gas of section J and reservoir oil of section R gives basically the same displacement as would occur in a "complete M" type process but with the use of pressures considerably below the pressures used in a "complete M" type process.

We have found that the specific range of pressures to be used in the "M front" type process of this invention varies for each system of reservoir oil and injection gas, however, these pressures can be determined by well known experiments. These experiments are commonly referred to as "batch PVT" and "long core displacement" experiments.

Briefly, in a batch PVT experiment an increment of the gas to be injected is added to the reservoir oil and mixed at a constant temperature while the pressure on such mixture is increased. The saturation pressure (bubble point in this case) is thus determined. Thereafter additional increments of gas are added step by step and after adding each increment of gas the pressure to which the mixture is subjected is increased making the gas dissolve into the reservoir oil. For each step the saturation pressure for each added increment is determined. It is well known that as additional increments of gas are added to the reservoir oil, the saturation pressure increases. It is also well known that for a given mixture of gas in oil the addition of any more gas will result in the reduction of the saturation pressure. The saturation pressure of such a given mixture of gas and oil is the pressure above which the gas and oil will be miscible with each other in all proportions. This pressure is commonly referred to as the cricondenbar and it will be explained in more detail hereinafter.

An example of conventional apparatus which can be used in a batch PVT experiment is shown in Figure 3. Reference numerals 21 and 22 represent conventional mercury pumps which are adapted to increase and decrease the pressures in the constant temperature visual cell 23 and the high pressure storage cells 24 and 25, respectively. Storage cell 24 stores the reservoir fluid and storage cell 25 stores the gas. Valves 26, 27, 28, 29, 30 and 31 are located and adapted to be opened and closed so that the reservoir oil and gas can be transferred to the selected cells. In the use of the apparatus to determine the pressure where complete miscibility will exist between the reservoir oil in cell 24 and the gas in cell 25, valves 26, 27, 29, and 30 are opened and reservoir oil transferred from cell 24 to constant temperature visual cell 23. Thereafter valves 27 and 30 are closed and a small amount of gas from cell 25 is added to cell 23 by opening the valves 28 and 31. The pressure is then increased in cell 23 by adding mercury from pump 21 and the cell is agitated until the gas is dissolved in the fluid. The saturation pressure of the resultant fluid is determined by observing the lowest pressure where a single phase will exist. Other increments of gas are added, dissolved, and the saturation pressure determined in the manner previously described.

Figure 4 shows a chart of the plots of several saturation pressures for various mixtures of reservoir oil R and increments of each of the injection gases $J_1$, $J_2$ and $J_3$, whose compositions are set forth hereinafter. It will be observed that the original saturation pressure of the reservoir oil was 2,250 p. s. i. and that when gas $J_1$, $J_2$ and $J_3$ were separately added in increasing increments the saturation pressure in each case increased to 8,000 p. s. i., 5,600 p. s. i., and 3,700 p. s. i., respectively, and that the saturation pressures decreased thereafter when additional increments of gas were added. This highest pressure at which each of the mixtures at a given temperature can exist in two phases shall be referred to as the cricondenbar. Ordinarily, the cricondenbar has been used to denote the maximum pressure at which a given binary system of a given composition can exist in two phases. (See Chemical Engineering Thermodynamics, Dodge-McGraw-Hill, first edition, p. 545.) However, for purposes of this invention the cricondenbar shall mean the maximum pressure at reservoir temperature at which two phases can exist for any mixture consisting of the oil of said reservoir and the injection gas which is proposed to be injected into said reservoir. An example of the cricondenbar as used in this sense is disclosed in Petroleum Transactions, AIME, vol. 195, p. 181 (1952). It should be realized that apparatus equivalent to that shown in Figure 3 can be used to determine the cricondenbar and that this invention is not limtied to any specific method for determining such cricondenbar.

Recently, as evidenced by the previously mentioned publication in the Petroleum Transactions, AIME, it has become the acceptable theory in high pressure gas injection processes that one must inject gases at pressures above the cricondenbar for each respective combination of reservoir oil and injection gas in order to get complete miscibility and the highest ultimate recovery of reservoir oil. For example, according to present day concepts, those skilled in the art would recommend that the pressures at which $J_1$ and $J_2$ should be injected into the reservoir, containing oil R, should be 8,000 p. s. i. and 5,600 p. s. i., respectively, in order to obtain near 100% recovery. According to this invention the same ultimate recovery, which is ordinarily expected only when pressures above the cricondenbar are used, can be obtained by using pressures considerably below the cricondenbar pressure but above a pressure determined by long core displacement experiments.

Long core displacement experiments have been used for years to study the flow of oil-gas mixtures through unconsolidated sands. Most of this study has been restricted to interpretation of heterogeneous fluid flow which depends primarily upon the relative permeability of the formation (core material) and viscosity ratio at the interface between injected gas and reservoir oil. We have found that the flow characteristics of the formation have a minor effect upon the ultimate oil recovery when the oil is displaced by a phase miscible with it. Therefore, of prime importance is the pressure at which the gas is miscible with the reservoir oil.

As previously stated, heretofore it has been the consensus of those skilled in the art that oil is displaced with a miscible phase only when a pressure above the cricondenbar for a mixture of the oil and displacing fluid is used. We have found that pressure well below the cricondenbar can be used to give a phase miscible with the oil at the front.

According to this invention the minimum pressure at which miscibility exists at the front is determined by long core displacement experiments. Long core displacement experiments of this invention comprise displacing reservoir oil from a reservoir oil saturated core with a natural gas at several different pressures and observing with a visual cell the lowest pressure at which there are no separate phases flowing out of the core simultaneously. This lowest pressure observed is the lowest pressure limit of this invention, the higher limit being the cricondenbar as defined above.

Figure 5:
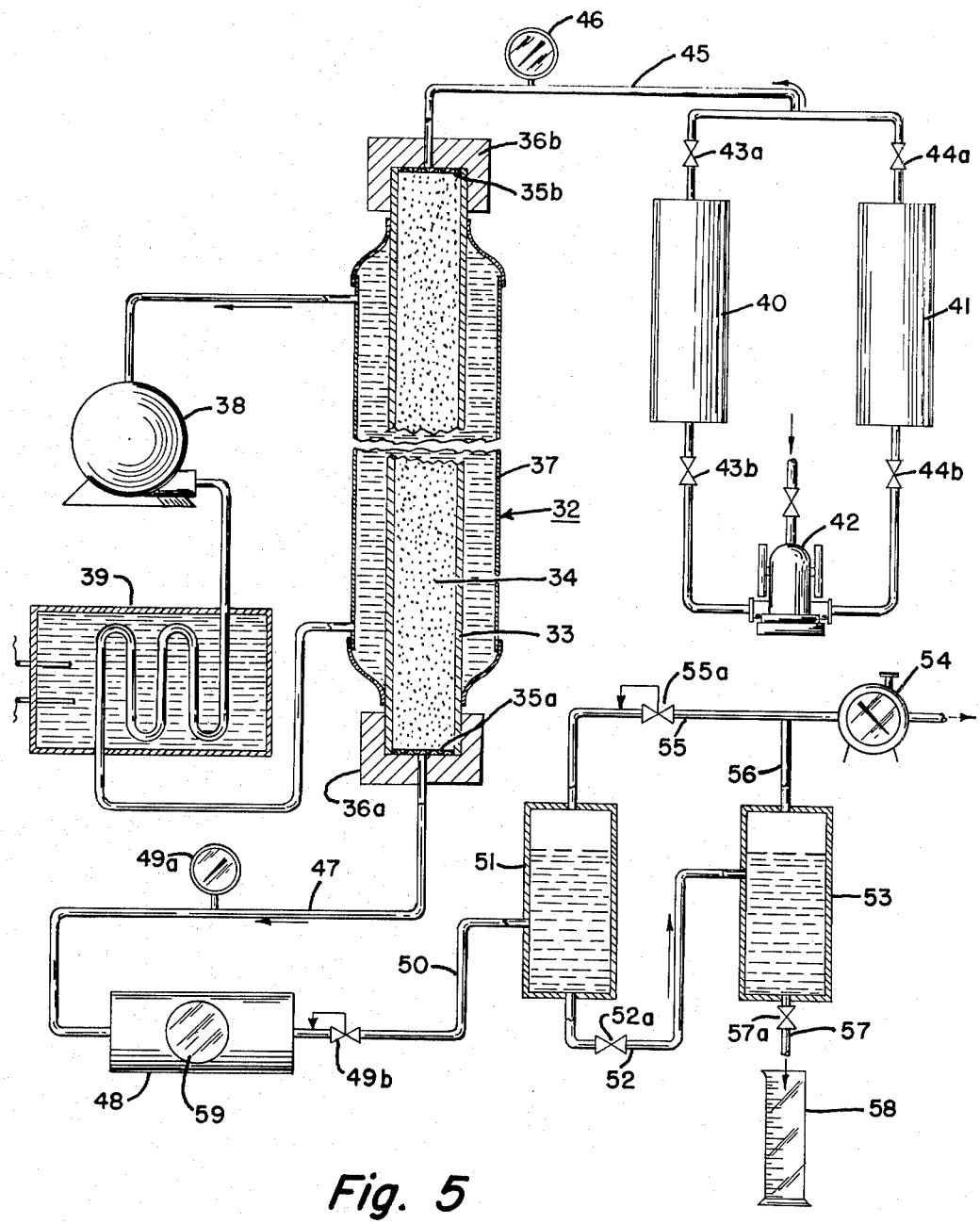
Figure 5 is a diagrammatic view of an apparatus for determining the lower limit for the pressure range of this invention.

Apparatus which is suitable for performing a long core displacement experiment, hereinafter referred to as a "long core run," is shown in Figure 5. This apparatus comprises the artificial core 32 which was constructed by filling a 20-foot length of 2-inch tubing 33 with a 140–200 mesh sand 34. The length of sand core 34 is an important factor because a short core will not be sufficiently long to set up a long enough "zone of contact" between the oil and the gas to prevent the gas from flowing out of the core simultaneously with the effluent oil. We have found that in long core experiments designed to determine the lowest pressure at which the transition zone will be set up in the reservoir, a 20-foot core having a diameter of two inches is sufficient. It should be understood that equivalent cores of different lengths can be used to determine such lowest pressure, the only limitation being that the length is such that the zone of contact formed between the oil and the gas is made sufficiently long to prevent the gas from flowing out of the core simultaneously with the effluent oil. We have experimented with cores exceeding 100 feet and found that the lowest pressure at which two phases can be visualized is the same for a 20-foot core as it is for a 100-foot core; therefore, for purposes of this invention it will be specified that cores at least 20 feet long should be used to determine the lower limit of our pressure range, however, equivalent cores can be used to determine the lowest pressure referred to above without departing from the scope of this invention.

Referring again to Figure 5, filters 35a and 35b were placed at each end of the tubing to retain the sand therein. These filters are retained in position by the elements 36a and 36b, respectively. Around tubing 33 is located an oil jacket 37 through which hot oil is circulated to keep the core at the desired reservoir temperature. Pump 38 circulates the oil through an oil heating unit 39 and then into oil jacket 37. The apparatus also comprises a reservoir oil storage cell 40, a high pressure gas storage cell 41, and a high pressure proportioning pump 42.

Valves 43a and 43b located above and below the reservoir oil storage cell 40 control the flow of oil into and out of the reservoir oil storage cell. Similarly, valves 44a and 44b control the flow of the high pressure gas into and out of the high pressure gas storage cell 41. Conduit 45, located between the core 32 and storage cells 40 and 41, is provided to permit gas or oil flow into the sand core 34. Pressure gauge 46 is located in the conduit 45 to indicate the core inlet pressure at which the gas is injected into sand core 34. Extending from the bottom of sand core 34 is conduit 47 which leads to high pressure visual observation cell 48. Located in conduit 47 is pressure gauge 49a which indicates the pressure of the effluent as it leaves sand core 34. At the outlet of observation cell 48 is located back pressure regulator 49b which controls the pressure at which gas is passed through sand core 34. Conduit 50 which is in communication with high pressure separator 51 is connected to back pressure regulator 49b, and conduit 52 leads from the bottom of the high pressure separator 51 to an atmospheric pressure separator 53. From the tops of the high pressure separator 51 and atmospheric pressure separator 53 pipes 55 and 56 lead to wet test meter 54. In pipe 55 is located a back pressure regulator 55a which controls the pressure in high pressure separator 51. To the other end of the atmospheric pressure separator is connected pipe 57 for conducting the liquid effluent from the atmospheric pressure separator 53 to the stock tank 58, where the volume of the effluent is measured to determine the per cent recovery from the core. Liquid level control valves 52a and 57a are located in lines 52 and 57 for holding liquid levels in the separators.

The laboratory experiment with the above described apparatus is conducted in the following manner. Oil which had been stabilized at atmospheric pressure, and which is referred to hereinafter as "dead oil" is pumped into sand core 34 under a pressure of 500 p. s. i. to displace air or gas which was present therein. By circulating hot oil in jacket 37 by means of pump 38 the core is brought up to the desired reservoir temperature. The reservoir oil is then pumped into the core from the reservoir oil storage cell by means of valves 43a and 43b and proportioning pump 42 in a manner well known in the art. Reservoir oil is pumped into the core until all of the dead oil has been displaced and the core is at the desired reservoir pressure. At this time injection of normally gaseous hydrocarbons is commenced in a manner similar to the gas injection process previously described by displacing gas from high pressure gas storage cell 41. This is accomplished by closing valves 43a and 43b and opening valves 44a and 44b and thereafter displacing the gas with water by means of proportioning pump 42 through conduit 45 into the sand 34. The effluent end of the core at pressure gauge 49a is maintained at a pressure somewhat lower than the injection pressure at pressure gauge 46 by adjusting back pressure regulator 49b. This pressure differential, of about 50 p. s. i., causes the injected gas to flow through the core forcing oil therefrom. The effluent oil and the injected gas pass through conduit 47 into visual cell 48, and one observes through glass 59 of visual cell 48 whether the effluent consisting of the mixture of displaced oil and injected gas is in one or two phases. Several long core runs are made at different injection pressures of the gas for purposes of determining the lowest pressure at which two phases will not be observed through visual glass 59 when a mixture of displaced oil and injected gas is passing therethrough. As stated above, this lowest pressure is the lower pressure limit of this invention. It should be understood that for each different combination of reservoir oil and injection gas this lowest pressure at which a single phase will be observed at all times is different. We have found that the maximum recovery is obtained when a single phase is observed at all times in visual cell 48 because the absence of two phases indicates that the zone of contact previously referred to has been formed and the hydrocarbons present in such zone are miscible with the reservoir oil and also the injected gas. On the other hand, when two phases are present, as in a low-pressure gas drive or the so-called "High Pressure I" type process, the zone of contact previously referred to is not set up resulting in immiscibility and residual oil being left in place. We have also discovered that the lowest pressure at which a single phase is observed at all times is considerably below the cricondenbar of the specific system, and accordingly pressures considerably below the cricondenbar can be used to give near 100% recovery as is expected if pressures above the cricondenbar are used.

After the effluent oil passes through visual cell 48, it flows into separators 51 and 53 which are provided for stabilization of the effluent. Thereafter, the liquid is conducted through pipe 57 to stock tank 58. The gas flows through pipes 55 and 56 to wet test meter 54 and thereafter to a gas storage tank, not shown.

The following example of results obtained in the laboratory by the experiments conducted as described above illustrate the pressure range contemplated for use in this invention. In this example a reservoir oil R and injection gas $J_1$, whose compositions are hereinafter set forth, were mixed in several different proportions and the highest pressure where saturation exists was observed by means of the batch PVT experiment described above. Figure 4 shows the result and indicates that the cricondenbar at the temperature of the reservoir from which oil R was extracted is 8,000 p. s. i. Next a sample of the reservoir oil R was displaced in long core runs by the injection gas $J_1$ at several different pressures in the manner previously described and it was finally determined that the lowest pressure at which a one phase effluent is produced is 3,700 p. s. i. Therefore, in accordance with this invention the pressure range contemplated for use on the reservoir from which R was extracted when the injection gas $J_1$ is to be used is determined to be between 3,700 and 8,000 p. s. i., it being recognized that 3,700 p. s. i. is the most practical and economical pressure to use.

From the above description it is evident that the "M front" process of this invention differs from conventional low presure gas sweeps and from recently discovered high pressure gas sweeps in that a specific range of pressures is used which gives an unexpected increase in the amount of oil that may be recovered. This range of pressures, as pointed out above, lies below the cricondenbar pressure for the reservoir oil and injection gas system and above the lowest pressure where no separate phase can be observed in a long core run as described above. In order to graphically illustrate this pressure range, it is helpful to use triangular phase diagrams which have been used extensively as a tool to describe the phase relationships of mixtures consisting of three components. Such diagrams are explained in detail in the Chemical Engineers' Handbook, J. H. Perry, 3rd Edition, McGraw-Hill, p. 719.

In a triangular phase diagram the vertexes represent the pure components, and the sides of the equilateral triangle are scaled to represent binary compositions of the three possible pairs. Ternary compositions are located within the triangle. When one of the pure components is miscible with the other two pure components in all proportions and the other two pure components are only partly miscible, a composition located within the triangle is either homogeneous, in one phase, or heterogeneous, in two phases, depending upon the temperature and pressure. The boundaries between these one and two phase regions at a given temperature and pressure is often referred to as a phase boundary curve. It should be understood that phase boundary curves are effected by both temperature and pressure.

Figure 6 shows a typical three component triangular diagram in which the vertexes arbitrarily represent the hydrocarbon components $C_1$ (methane), $C_2$ through $C_6$ (intermediates—mainly ethane, propane, etc. up to hexane), and $C_{7+}$ (heptanes and heavier hydrocarbons). The sides of the equilateral triangle are scaled to represent binary compositions of the three possible pairs of these components. It should be understood that the above division of multi-component hydrocarbon systems into $C_1$, $C_2$ through $C_6$, and $C_{7+}$ is practical from an analytical point of view and also brings out the importance of the intermediates ($C_2$ through $C_6$) in the process of this invention, however, the arbitrary representation of the complex hydrocarbon system by a three-component analog is obviously not thermodynamically rigorous. Nevertheless, these diagrams have proved to be of great practical value and aid in carrying out the experiments necessary for determining the range of pressures to be used in the process of this invention and they are very helpful in understanding the process.

In Figure 6, any point within the triangle represents a system with a specific composition made up of definite amounts of $C_1$, $C_2$ through $C_6$, and $C_{7+}$. The percent composition of each component $C_1$, $C_2$—$C_6$, and $C_{7+}$ of such a system is determined by observing the distance the point in the triangle lies from the sides of the triangle opposite the respective components. Each of the lines in the triangle represents 5% increments. Therefore point R, for example, represents a reservoir oil consisting of 11.3% $C_1$, 27.2% $C_2$—$C_6$, and 61.5% $C_{7+}$. Similarly, a known composition can be plotted on the chart. For example, consider the compositions of the reservoir oil R and injection gases $J_1$, $J_2$, and $J_3$ which are:

| | Composition R, weight percent | Composition $J_1$, weight percent | Composition $J_2$, weight percent | Composition $J_3$, weight percent |
|---|---|---|---|---|
| $C_1$ | 11.3 | 75 | 52.4 | 49 |
| $C_2$ | 6.2 | 25 | 22.1 | 23.5 |
| $C_3$ | 6.6 | | 15.9 | 16.4 |
| $C_4$ | 5.8 | | 5.8 | 6.6 |
| $C_5$ | 3.5 | | 2.0 | 2.1 |
| $C_6$ | 5.1 | | .4 | .4 |
| $C_{7+}$ | 61.5 | | 1.4 | 2.0 |
| Total | 100.0 | 100 | 100.0 | 100.0 |

From the composition of reservoir oil R the percentage of each component $C_1$, $C_2$ through $C_6$, and $C_{7+}$ (i. e. $C_1=11.3$, $C_2$ through $C_6=27.2$ and $C_{7+}=61.5$) is determined and thereafter plotted on the chart at R. The percentage of components in the injection gases are similarly obtained and plotted on the chart at $J_1$, $J_2$, and $J_3$. Thus, we are able to locate the reservoir fluid and injection gas on the triangle diagram.

As above pointed out, it should be realized that both temperature and pressure affect the type of phase boundary curve for a given system, however, for use in studying the solubility properties of a reservoir oil where the temperature is known and essentially constant the only variable that is of interest is the pressure. Therefore, it is only necessary to construct a series of phase boundary curves for different pressures and constant temperature in order to determine the pressures at which the reservoir fluid or any mixtures thereof will exist in a single or two phases.

An example of such a phase boundary curve for the reservoir R at a particular pressure $P_3$ is shown in Figure 6. It is evident from the figure that the curve defines the single phase region lying outside the two phase region ACB. According to the well known theory if a hydrocarbon gas which lies near the line $C_1$ to $C_2$—$C_6$ such as $J_1$ or $J_2$ is mixed with the reservoir fluid R at the pressure $P_3$ and the resultant composition falls within the region ACB, the composition at equilibrium would separate into two phases, one a saturated liquid and the other a saturated gas. The compositions of these two ternary phases, comprising the saturated liquid and saturated gas, will lie at separate points on opposite sides of the saturation curve ACB, the liquid phase lying at a point along saturated liquid curve AC and the gaseous phase lying at a point along saturated vapor curve BC. A line joining the two points is commonly referred to as a tie line.

In the example shown $J_1$ is mixed with the reservoir fluid R, therefore the resultant mixture lies on the line $J_1R$ for example at point $X_1$ and the composition thereof at equilibrium separates into the liquid phase $Y_1$ and the gaseous phase $Z_1$. It is well known and should be evident from Figure 6 that if a richer gas is mixed with reservoir fluid R the tie line becomes shorter. Thus when the gas $J_2$ is mixed with the reservoir fluid R at pressure $P_3$ the resultant mixture $X_2$ separates into the gaseous phase $Z_2$ and liquid phase $Y_2$. Finally as the richness of the injected gas is increased, a composition is reached such that mixtures of the gas and reservoir oil will lie along a line which is tangent to the phase boundary curve as illustrated by mixtures of gas $J_3$ and oil R. Gases as rich as $J_3$ will always be miscible with the reservoir fluid R at the pressure $P_3$ and consequently $P_3$ is the cricondenbar for a system comprising reservoir liquid R and gas $J_3$. Similarly the cricondenbars for the systems comprising reservoir liquid R and gas $J_1$, reservoir liquid R and gas $J_2$ would be equal to the pressures $P_1$ and $P_2$, respectively, as shown in Figure 7.

Relating the information shown on Figure 4 which was previously described, to the triangular phase diagram of Figure 6 it should be realized that the compositions represented by points D, E, F, and G in Figure 4 are correspondingly shown on Figures 6 at D, E, F, and G, respectively. For example, from Figure 4 it is determined that point D represents 11% gas $J_1$ and 89% reservoir oil R. Accordingly, the liquid phase resulting from this mixture of $J_1$ and R at 3,700 p. s. i., as determined by multiplying the compositions of R and $J_1$, as previously set forth by their respective percentages, consists of $C_1 = 10.06 + 8.25 = 18.31\%$, $C_2$ through $C_6 = 24.20 + 2.75 = 26.95\%$, and $C_{7+} = 54.74\%$. This composition is plotted at point D. Similarly, points E, F, and G can be plotted. It is thus evident that by a series of batch PVT runs with lean and rich gases such as $J_1$ and $J_2$ respectively, a series of phase boundary curves can be plotted on the triangular diagram. It should also be realized that the curve can be checked by running a batch PVT experiment with the mixture consisting of gas $J_3$ and the reservoir oil R and determining that the cricondenbar when gas $J_3$ is injected to $P_3$ or 3,700 p. s. i.

Thus far the cricondenbars for specific mixtures of reservoir oil R and gases $J_1$, $J_2$, and $J_3$ have been illustrated by the triangular phase diagram, and consequently the upper limit of the range of pressures of this invention has been illustrated graphically. It is seen from such graphical presentation that the upper limits for the above mixtures are $P_1$, $P_2$, and $P_3$, respectively. It is thought that the lower limit can be illustrated as follows by referring to Figure 8 wherein is shown a triangular phase diagram with reservoir liquid R and gas $J_1$ plotted thereon. As explained previously when the gas $J_1$ is injected into the reservoir containing reservoir oil R at the front where R and $J_1$ contact one another there is an exchange of hydrocarbon components between the gas $J_1$ and oil R resulting in a modification of the properties of both phases, as shown in Figure 2. As the injected gas $J_1$ moves through the reservoir oil R it extracts the intermediate-weight-hydrocarbons from the residual oil in its path. It should be realized that this enrichment is gradual varying from non-contacted gas which is not enriched to very rich gas at the very front which is completely miscible with the reservoir oil R. This enrichment can be graphically illustrated in Figure 8 by drawing a line between $J_1$ and R and observing the two phases comprising the liquid Y and the gas Z which is formed by such a mixture. It is then evident that Z will mix with R and form into $Z_1$ and $Y_1$. Similarly, $Z_1$ added to R forms $Z_2$, etc., and finally after numerous mixtures the gas is enriched to the composition $Z_3$ which is completely miscible with R. Consequently, a miscible front is formed when the pressure $P_F$ is used, and a displacement, comparable to the case where complete miscibility between the gas $J_1$ and reservoir oil R, is obtained.

Figure 8 shows the phase curve for the cricondenbar $P_A$ of the system of $J_1$ and R and therefore illustrates the pressure above which the "complete M" type process previously referred to is applicable. It should therefore be realized that in the system involving R and $J_1$ any pressures between the pressures $P_A$ and $P_F$ could be used in the "M front" type process of this invention and that at pressures less than $P_F$, such as $P_I$, the "High Pressure I" type process would be practiced since at pressures less than $P_F$ the gas $J_1$ even at the very front would be always immiscible with the reservoir oil R.

It is thus seen that this invention has provided a process whereby an unexpected recovery is obtained within a particular pressure range which depends exclusively upon the oil in the reservoir and the gas to be injected. This unexpected result can better be appreciated if reference is made to Figure 9 wherein is shown the per cent oil displacement of reservoir R at various injection pressures using the injection gas $J_1$. This curve was obtained in long core displacement experiments by measuring the liquid oil effluent from the core and comparing it with the amount of oil used to saturate the core.

It will be noted that for pressures below 4,000 p. s. i. there is an increase in oil recovery obtainable by increasing the pressure, especially above 3,000 p. s. i., but the curve levels off above pressures of 3,700 p. s. i., indicating that no substantial part of the oil which is not recoverable by operating the reservoir at about 3,700 p. s. i. may be recovered by operating above that pressure. The curve also illustrates that pressures above the cricondenbar, 8,000 p. s. i. in this case, will not give any more increased percentage of recovery than will the pressures between 3,700 and 8,000 p. s. i. Figure 9 also substantiates the findings obtained by the batch PVT and long core experiments previously set forth. In those experiments it was determined that the pressure range contemplated for use in this invention should be between 3,700 and 8,000 p. s. i. and that an unexpected recovery near 100% should be obtained by the use of such pressures in displacing the reservoir oil R with the injection gas $J_1$ which is contrary to the thinking of those skilled in the art who up to the present time have proposed that near 100% recoveries can only be obtained by using pressures above the cricondenbar.

Figure 10 also graphically shows the unexpectant results obtained by the process of this invention. Figure 10 shows a curve which illustrates the increased per cent recovery of oil per unit of pressure which is obtained by the use of the process of this invention. It will be noted that at low pressures the per cent recovery per unit of pressure is noticeably high but rapidly declines as the pressures are increased. Until the present, it has been the opinion of those skilled in the art that this per cent recovery per unit of pressure would continue to decline. As evidenced by the graph of Figure 9 that is not the case. At pressures within the range contemplated by this invention the per cent recovery per unit of pressure increases and is greater than at any other high pressures and also within the same pressure range a maximum per cent of recovery is obtained. It should be noted that at the lowest pressure where a single phase was observed in a long core run, the per cent recovery per unit of pressure is the greatest. Therefore, it is evident that with the process of this invention one can obtain the maximum per cent recovery of oil at the lowest economical cost. Furthermore, in many cases, where it was believed that pressures necessary to give the maximum per cent recovery would be too excessive and result in lifting the overburden or otherwise damage the reservoir by causing heaving or cracking, pressures well below such excessive pressures can be used to give a maximum per cent recovery.

While in the foregoing there have been shown and described preferred embodiments of this invention, it is to be understood that minor changes in the details of the experiments described may be resorted to without departing from the spirit and scope of the invention as claimed. Furthermore, it should be understood that the triangle phase diagram is not thermodynamically rigid and is described in relation to the process of this invention for purposes of illustration only. This invention is restricted only in accordance with the following claims.

We claim:

1. The method of recovering oil from a reservoir containing hydrocarbons in the liquid oil phase but having substantially no separate gaseous phase such liquid oil being undersaturated with hydrocarbon gases and thereby being capable of absorbing normally gaseous hydrocarbons, said reservoir having in communication therewith at least one injection well and one production well, comprising the steps of injecting into the reservoir through said injection well normally gaseous hydrocarbons at a predetermined pressure whereby said injected gases will essentially contact a portion of the reservoir oil adjacent the injection well and will be absorbed such portion of the reservoir oil to establish a zone of contact which advances from said injection well in the direction of the production well while the injection of said normally gaseous hydrocarbons is contained, said predetermined pressure being great enough to maintain on said reservoir a pressure which lies within a pressure range determined by ascertaining the cricondenbar of a mixture of said reservoir oil and said normally gaseous hydrocarbons and ascertaining the lowest pressure at which a sample of said normally gaseous hydrocarbons will displace the entire quantity of a sample of said undersaturated reservoir oil from a sand core having a length of at least 20 feet filled with said reservoir oil sample at the temperature of said reservoir without the presence of two separate phases flowing simultaneously out of said core, and simultaneously withdrawing from said reservoir through said production well reservoir oil in the liquid phase.

2. The method of recovering oil from a reservoir containing hydrocarbons in the liquid oil phase but having substantially no separate gaseous phase such liquid oil being undersaturated with hydrocarbon gases and thereby being capable of absorbing normally gaseous hydrocarbons, said reservoir having in communication therewith at least one injection well and one production well, comprising the steps of injecting into the reservoir through said injection well normally gaseous hydrocarbons at a predetermined pressure whereby said injected gases will essentially contact a portion of the reservoir oil adjacent the injection well and will be absorbed by such portion of the reservoir oil to establish a zone of contact which advances from said injection well in the direction of the production well while the injection of said normally gaseous hydrocarbons is continued, said predetermined pressure being essentially equal to the pressure which will maintain on the reservoir a pressure determined by ascertaining the lowest pressure at which a sample of said said normally gaseous hydrocarbons will displace the entire quantity of a sample of said reservoir oil from a sand core having a length of at least 20 feet filled with said reservoir oil sample at the temperature of the producing reservoir without the presence of two separate phases flowing simultaneously out of said core, and simultaneously withdrawing from said reservoir through said production well reservoir oil in the liquid phase.

3. The method of recovering oil from a reservoir containing hydrocarbons in the liquid oil phase and a small volume of light-weight hydrocarbons as a separate free gaseous phase, and wherein the oil phase and the gaseous phase are under a pressure which is approximately equal to or slightly lower than the original reservoir saturation pressure, said reservoir having in communication therewith at least one injection well and one production well, comprising the steps of injecting into the reservoir through said injection well normally gaseous hydrocarbons at a predetermined pressure whereby said gases will build up the reservoir pressure, thereby causing said hydrocarbons in the free gaseous phase to be pushed back into solution with said liquid oil thereby making the reservoir oil undersaturated, continuing the injection of said gas into said reservoir at said predetermined pressure whereby said injected gases will first be absorbed by that portion of the newly established undersaturated oil nearest said injection well to establish a zone of contact which advances from said injection well in the direction of the production well as the injection of said normally gaseous hydrocarbons is continued, said predetermined pressure being great enough to maintain on said reservoir a pressure which lies within a pressure range determined by ascertaining the cricondenbar of a mixture of said reservoir oil and said normally gaseous hydrocarbons and ascertaining the lowest pressure at which a sample of said normally gaseous hydrocarbons will displace the entire quantity of a sample of said undersaturated reservoir oil from a sand core having a length of at least 20 feet filled with said reservoir oil sample at the temperature of said reservoir without the presence of two separate phases flowing simultaneously out of said core, and simultaneously withdrawing from said reservoir through said production well reservoir oil in the liquid phase.

4. The method as defined in claim 3 in which said predetermined pressure is essentially equal to the pressure which will maintain on the reservoir a pressure determined by ascertaining the lowest pressure at which a sample of said normally gaseous hydrocarbons will displace said reservoir oil from a sand core having a length of at least 20 feet filled with said reservoir oil sample at the temperature of the producing reservoir without the presence of two separate phases flowing simultaneously out of said core.

References Cited in the file of this patent

UNITED STATES PATENTS

| | | |
|---|---|---|
| 1,899,497 | Doherty | Feb. 28, 1933 |
| 2,135,319 | Bays | Nov. 1, 1938 |
| 2,609,051 | Brownscombe | Sept. 2, 1952 |